United States Patent Office 3,709,992
Patented Jan. 9, 1973

3,709,992
FUNGICIDAL USE OF CERTAIN CARBOXAMIDOTHIAZOLES
Bogislav von Schmeling, Hamden, Conn., and William A. Harrison and Marshall Kulka, Guelph, Ontario, Canada, assignors to United States Rubber Company, New York, N.Y.
No Drawing. Original application July 7, 1966, Ser. No. 611,197, now Patent No. 3,505,055, dated Apr. 7, 1970. Divided and this application Nov. 18, 1969, Ser. No. 877,824
Int. Cl. A01n 9/12
U.S. Cl. 424—270    9 Claims

ABSTRACT OF THE DISCLOSURE

This invention relates to the use of carboxamidothiazoles as fungicides.

---

This application is a division of Von Schmeling et al. pending application Ser. No. 611,197, filed Dec. 7, 1966, now Patent No. 3,505,055.

This invention relates to the use of carboxamidothiazoles as fungicides and plant growth regulants. More specifically, the invention is directed to use carboxyamidothiazoles having the formula:

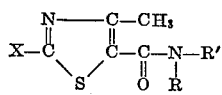

wherein R is hydrogen ar alkyl; R' is hydrogen, allyl, cycloalkyl, aralkyl, aryl, alkaryl, or alkoxy, halo or nitro derivatives thereof; or R and R' may be joined together to form a heterocyclic group; and X may be alkyl, amino, or an alkyl, aryl or acyl substituted amino group, with the provision that, when X is methyl, $R^1$ can only be phenyl when the compounds are used as fungicides.

The alkyl groups referred to above preferably are lower alkyl having from 1 to 8 carbon atoms, e.g., methyl, ethyl, isopropyl, cyclohexyl and octyl; the aralkyl groups include the phenyl substituted lower alkyls, e.g., benzyl; and haloalkyls and haloaryl include the mono-, di-, and trisubstituted chloro and bromo, lower alkyls and aryls, respectively. Aryl groups include phenyl and naphthyl. Of the substituted aryls the lower alkyl and alkoxy are preferred. Examples of the latter are methoxyphenyl and isopropoxyphenyl. Typical of the aryl substituted groups are those derived from the lower carboxylic acids and those having nitro groups. Heterocyclic groups which may be formed by joining R and R' are morpholido and other five to seven member rings containing nitrogen and carbon or nitrogen, carbon and oxygen ring members.

The chemical may be applied to seeds by tumbling the chemical with the seeds, either alone or in admixture with a powdered solid carrier, to coat the seeds. Typical powdered solid carriers are the various mineral silicates, e.g., mica, talc, pyrophillite, and clays. The chemical may also be applied to the seeds of admixture with a conventional surface-active wetting agent, with or without additional powdered solid carrier, as by first wetting the mixture with a small amount of water and then tumbling the seeds in the slurry. The surface-active wetting agents that may be used with the chemical may be any of the conventional anionic, nonionic, or cationic surface-active agents. Such surface-active agents are well known and reference is made to U.S. Pat. No. 2,547,724, columns 3 and 4, for detailed examples of the same. The chemical may be applied as a dust in admixture with sand or dirt or a powdered solid carrier such as a mineral silicate, with or without an additional surface-active wetting agent, to the furrows with the planting of the seeds, or the chemical may be applied as an aqueous spray, if desired including a surface-active dispersing agent, or a surface-active dispersing agent and a powdered solid carrier, to the seed rows before, or with, or after planting the seeds.

As a seed protectant, the amount of the chemical coated on the seeds will be ¼ to 12 ounces per hundred pounds of the seed.

As a soil fungicide, the amount of the chemical applied to the seed rows will be from 0.1 to 10 pounds per acre applied to the seed rows the equivalent of an area 2″ wide and 2″ deep to parallel rows in one direction a distance of 40″ apart. Also, as a soil fungicide, the chemical may be applied broadcast as a silica dust or aqueous spray with an application rate of 1.0 to 100 pounds per acre. As a foliage fungicide, the chemical may be applied to growing plants at a rate of ¼ to 10 pounds per acre. Such application is generally an aqueous spray which also contains a surface-active dispersing agent, or a surface-active dispersing agent and a powdered solid carrier.

As a growth regulant the chemical may be applied to various plant parts such as seed at a rate of 0.05 to 5.0 pounds per hundred pounds of seed.

Examples of the fungicides of the invention are:

2-amino-4-methyl-5-carboxanilidothiazole
2-amino-4-methyl-5-(o-tolyl)carboxamidothiazole
2-amino-4-methyl-5-(m-tolyl)carboxamidothiazole
2-amino-4-methyl-5-p-nitrocarboxanilidothiazole
2,4-dimethyl-5-carboxanilidothiazole
2,4-dimethyl-5-(o-tolyl)carboxamidothiazole
2-ethyl-4-methyl-5-carboxanilidothiazole
2-ethyl-4-methyl-5-(m-tolyl)carboxamidothiazole
2-isopropyl-4-methyl-5-carboxanilidothiazole
2-isopropyl-4-methyl-5-(o-tolyl)carboxamidothiazole
2-amino-4-methyl-5-p-phenylcarboxanilidothiazole
2-amino-4-methyl-5-m-trifluoromethylcarboxanilidothiazole
2-amino-4-methyl-5-o-carbethoxycarboxanilidothiazole
2-amino-4-methyl-5-N-β-cyanoethylcarboxanilidothiazole
2-amino-4-methyl-5-N-α-pyridylcarboxamidothiazole
1,2-ethylene-bis-N,N'-(2-amino-4-methyl-5-carboxamidothiazole)
2-amino-4-methyl-5-N-tert.-butylcarboxamidothiazole
2-amino-4-methyl-5-(m-bromocarboxanilido)thiazole
2-amino-4-methyl-5-(2,3-dichlorocarboxanilido)thiazole
2-amino-4-methyl-5-(2,4-dichlorocarboxanilido)thiazole
2-amino-4-methyl-5-(2,5-dichlorocarboxanilido)thiazole
2-amino-4-methyl-5-(2,6-dimethylcarboxanilido)thiazole
2-amino-4-methyl-5-(2-chloro-6-methylcarboxanilido)thiazole
2-amino-4-methyl-5-m-methoxycarboxanilidothiazole
2-amino-4-methyl-5-(5-chloro-2-methoxycarboxanilido)thiazole
2,4-dimethyl-5-p-chlorocarboxanilidothiazole
2,4-dimethyl-5-o-methoxycarboxanilidothiazole
2-(N-nitrosomethylamino)-4-methyl-5-carboxanilidothiazole The aforesaid compounds may be prepared by the procedure shown in Boon, J. Chem. Soc. (1945), 601 or by the procedures shown in copending U.S. application 3,807, filed simultaneously herewith.

The following examples illustrate the invention. All parts and percentages are by weight.

EXAMPLE 1

The ability to control plant diseases which are already established in the plants was evaluated by employing the following testing technique.

Two hundred milligrams chemical are dissolved in 20 ml. of acetone and 60 mg. of a surfactant such as Tween-20 which is polyoxyethylene sorbitan monolaurate. This preparation is diluted with 80 ml. distilled water giving a chemical suspension of 2000 p.p.m. Further serial dilutions are prepared from this as desired. The chemical suspensions are sprayed on duplicate pots, each containing three snapbean plants which had, 48 hours prior to this, been inoculated with bean rust *Uromyces phaseoli typica* Arth. The spray application is made with a gun-type sprayer delivering 2.5 ml. per second. At the time of the chemical spray the bean plants have just begun to expand their first trifoliate leaves. The test plants are then placed in a control chamber for 24 hours at 75° F. and 100% relative humidity. After this time the plants are returned to the greenhouse. About 10 days later the plants are scored for disease control.

TABLE I

[The systemic fungicidal effect of carboxamido thiazole derivatives as measured by their ability to control the bean rust disease]

| Chemical | P.p.m. | Percent control |
|---|---|---|
| 2-amino-4-methyl-5-carboxanilidothiazole | 30 | 75 |
| | 125 | 98 |
| | 500 | 100 |
| 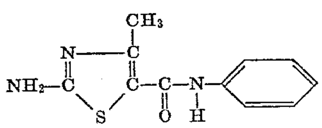  | | |
| 2-amino-4-methyl-5-(o-tolyl)carboxamidothiazole | 125 | 20 |
| | 500 | 60 |
| | 2,000 | 100 |
| 2-amino-4-methyl-5-(m-tolyl)carboxamidothiazole | 500 | 40 |
| | 2,000 | 75 |
| 2-amino-4-methyl-5-p-nitrocarboxanilidothiazole | 500 | 75 |
| | 2,000 | 75 |
| 2,4-dimethyl-5-carboxanilidothiazole | 500 | 97 |
| | 2,000 | 100 |
| 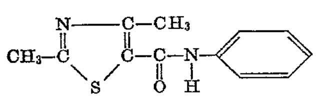  | | |

The results in Table I show that several compounds of this invention are effective chemotherapeutic agents, the most effective members of this series being first, second and last compounds.

EXAMPLE 2

This example shows a seed treatment test designed to investigate the systemic fungicidal effect of the compounds of this invention using the following method.

Eighty-seven milligrams chemical were applied to 70 grams snapbean seed (*Phaseolus vulgaris*), this amount being equivalent to an application rate of two ounces of chemical per 100 pounds of seed. The treated seed was tumbled for 45 minutes by mechanical rotation in an eight ounce glass jar. The seed was then planted in 4" greenhouse pots using 5 seeds per pot replicated five times, giving a total of 25 seeds per treatment. The test was conducted in a dosage series including snapbean seeds which were not chemically treated as checks. After planting the seeds the test was transferred to the greenhouse using subirrigation for watering the pots and allowing the seeds to germinate. After 10 days the plants which had fully expanded their primary leaves were inoculated with bean rust spores and incubated for 24 hours at 75° F. and 100% relative humidity. The plants were then returned to the greenhouse and regularly watered by subirrigation. Ten days later the plants were examined for development of the bean rust disease and compared with the untreated check. The results were as follows:

TABLE II.—CONTROL OF BEAN RUST BY SEED TREATMENT

| Chemical | Oz./100# | Percent control |
|---|---|---|
| Untreated check | | 0 |
| 2-amino-4-methyl-5-carboxanilidothiazole | 2 | 100 |
| | 4 | 100 |
| | 8 | 100 |
| 2-amino-4-methyl-5-(o-tolyl)carboxamidothiazole | 2 | 100 |
| | 4 | 100 |
| | 8 | 100 |
| 2-amino-4-methyl-5-carbethoxythiazole (Comparative example) | 2 | 0 |
| | 4 | 20 |
| | 8 | 50 |

The results show that the chemicals were translocated from the seeds into the foliage, making the leaves resistant to the bean rust disease. It was also noted that the bean plants treated with 2-amino-4-methyl-5-carboxanilidothiazole had a reduced height by about 60% as compared with the untreated check plants. The plants treated with 2-amino-4-methyl - 5 - carbethoxythiazole were slightly shorter than the untreated plants. No influence on the growth of the bean plants with 2-amino-4-methyl-5-(o-tolyl)carboxamidothiazole was noted.

EXAMPLE 3

This example evaluates chemicals of this invention as soil fungicides for their effectiveness to control soil-borne plant seedling diseases such as post-emergence damping-off of cotton seedlings caused by *Rhizoctonia solani* Kühn.

The test method used was as follows:

Sixty-six mg. of the chemical were thoroughly mixed in a glass jar with one pound of clean, dry sand. The mixing was accomplished by vigorously shaking the jar which was covered with a screw cap. This masterbatch was then thoroughly mixed with 6¼ pounds of soil to give a 20 p.p.m. (part per million) concentration of chemical in the soil-sand mixture. The treated soil was then placed into five 4" diameter pots in which 5 cotton seeds, Variety Fox-4, per pot were planted. Before covering the planted seed the pots were inoculated by placing a grain of oats, infested with *Rhizoctonia solani* Kühn from a two week old culture, in the center of each pot surrounded by the cotton seed. The seed and the inoculum were then covered with a layer of soil about ½" thick. Five replications were used giving a total of 25 seeds for each chemical treatment. An untreated check, replicated five times, in which seeds were planted and the inoculum of *Rhizoctonia solani* was placed on the soil in the center of the 4" pot but without the chemical treatment, was included in the test. Also a check, replicated five times, was included where seeds were planted in soil without chemical treatment and without the inoculum of the organism. After the planting was completed the pots were then transferred to the greenhouse, watered and kept under warm and moist conditions by using subirrigation and temperature control in maintaining 72° F. to 78° F. soil temperature. Results were taken two to three weeks later by counting the number of emerged and surviving cotton seedlings. The percent stand of cotton seedlings is calculated using the following formula:

$$\text{Percent stand} = \frac{\text{number of seedlings surviuing}}{\text{number of seedlings emerged}} \times 100$$

The following table gives the percent emergence and percent stand of cotton seedlings for chemical treatment with the chemicals listed at a concentration of 20 p.p.m., unless otherwise indicated, which is equivalent to an application rate of 0.6 pound/acre of the chemicals applied to the seed rows the equivalent of an area 2" wide and 2" deep to parallel rows in one direction a distance of 40" apart as compared to the untreated inoculated and untreated, uninoculated soil checks.

The chemicals shown have the formula:

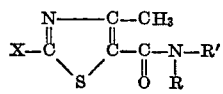

where, except where noted to the contrary, R is hydrogen and X is an amino group.

TABLE III

| R' | Percent Emergence | Stand |
|---|---|---|
| Phenyl | 76 | 76 |
| o-Tolyl | 56 | 48 |
| m-Tolyl | 76 | 60 |
| p-Tolyl (40 p.p.m.) | 68 | 40 |
| Phenyl X=acetamido (40 p.p.m.) | 68 | 64 |
| Phenyl X=methyl | 80 | 76 |
| Cyclohexyl (40 p.p.m.) | 80 | 60 |
| Isopropyl R=isopropyl (40 p.p.m.) | 72 | 52 |
| Butyl R=butyl (40 p.p.m.) | 68 | 46 |
| Morpholido (40 p.p.m.) | 72 | 54 |
| Phenyl X=methylamino (40 p.p.m.) | 80 | 60 |
| Phenyl X=phenylamine (40 p.p.m.) | 72 | 62 |
| Untreated inoculated soil (check) | 60 | 24 |
| Untreated uninoculated soil (check) | 72 | 78 |

It can be seen from Table III that the chemicals of this invention are effective soil fungicides, preventing post-emergence damping-off of cotton seedlings.

EXAMPLE 4

This example evaluates chemicals of this invention as systemic fungicides by using them as seed treatments for the prevention of seedling diseases such as are caused by the fungus Rhizoctonia solani which attacks cotton seedlings. The seeds were commercially treated with a mercury fungicide to prevent rotting.

Sixty-two milligrams chemical are applied to 50 grams acid delinted cotton seed in a glass jar. The seed is treated by tumbling for 45 minutes. The seed is then planted in 4" pots using 5 seeds/pot and a total of 25 seed/treatment. In the center of each pot a grain of oats, infested with Rhizotonia solani is placed, which is surrounded by the treated cotton seed. The seed and inoculum is covered with a layer of soil about ½" thick and the test is then transferred to the greenhouse where the pots are kept moist by subirrigation. A temperature of 72° to 78° F. is maintained for the test. Two untreated checks are included in the test, one containing the untreated seeds plus the inoculum, the other containing untreated seeds without the inoculum. Each untreated check is replicated five times with a total of 25 seeds. One week later the emergence of the cotton seed is recorded and after an additional week the stand of the cotton seedlings is recorded. The results were as follows:

TABLE IV

[Prevention of post-emergency damping-off of cooton seedlings with seed treatments]

| Chemical | Oz./100 lbs. | Percent Emergence | Stand |
|---|---|---|---|
| 2-amino-4-methyl-5-carboxanilidothiazole | 2 | 76 | 64 |
| | 4 | 68 | 60 |
| | 8 | 72 | 64 |
| 2-amino-4-methyl-5-(o-tolyl) carboxamidothiazole | 2 | 80 | 56 |
| | 4 | 80 | 64 |
| | 8 | 80 | 68 |
| Untreated inoculated soil (check) | | 68 | 32 |
| Untreated uninoculated soil (check) | | 80 | 80 |

The above results show that the chemicals of this invention prevented post-emergence damping-off of cotton seedlings when used as seed treatments.

EXAMPLE 5

This example evaluates chemicals of this invention as seed treatment fungicides in a field test for the prevention of Rhizoctonia solani, attacking bean seedlings. The field test was conducted in Sanford, Fla. during the spring.

The test procedure used and the results obtained were as follows: 62 mg. chemical were tumbled in an 8 oz. glass jar for 45 minutes with 100 g. pinto bean seed (Phaseolus vulgaris). This chemical amount is equivalent to a rate of 1 oz. per 100 lbs. seed. A dosage series of 1, 2 and 4 oz. per 100 lbs. was prepared accordingly.

The seed was planted in soil heavily invested with the fungus Rhizoctonia solani Kühn which produces disease lesions on the stems of the bean seedlings. Each treatment consisted of four times replicated 8 foot row plots, using a randomized plot arrangement. An untreated check, i.e., bean seeds without fungicide treatment, was included. Also included in the test was a seed treatment with pentachloronitrobenzene (PCNB), a commercial fungicide for prevention of Rhizoctonia solani disease symptoms. Normal cultural practices were employed during the growing season in keeping the plots free of weeds and insects. Also, the plots were kept moist by irrigation to assure high activity of disease organisms. About three weeks later results on disease control and general appearance of the bean plant growth were taken.

Disease ratings were made by inspecting 25 plants in each plot (100 plants per treatment) and dividing the diseased plants into three groups, according to the degree of stem infection, of light, moderate and severe. Each group was then multiplied by a factor of one for light, two for moderate and three for severe infection. The totals were added together and the results obtained in this manner expressed as disease index. The results are shown in the following table:

TABLE V.—BEAN SEED TREATMENT FIELD TEST

| Chemical | Rate, oz./100 lbs. | Disease index, lbs. |
|---|---|---|
| 2-amino-4-methyl-5-carboxanilidothiazole | 1 | 40 |
| | 2 | 28 |
| | 4 | 30 |
| Pentachloronitrobenzene | 1 | 94 |
| | 2 | 81 |
| | 4 | 72 |
| Untreated | | 139 |

The above results show that the fungicide of the invention markedly decreased the disease incidence of pinto beans as compared with the commercial treatment and the untreated check. Furthermore it was noticed that the four ounce rate had shortened the bean stems without affecting the leaves. The plants looked shorter without any signs of injury, indicating a favorable growth regulating effect on the bean plants.

EXAMPLE 6

This example evaluates chemicals of this invention as systemic fungicides for the control of a typical systemic fungus disease such as loose smut of barley caused by Ustilago nuda (Jens.) Rostr. Also, this example evaluates chemicals of this invention for their ability to regulate plant growth such as the growth of barley, Hordeum sativum Jess.

One hundred and twenty-four mg. chemical were tumbled in an eight ounce jar for 45 minutes with 50 grams of barley seed, var. Larker, known to be severely infected with the loose smut fungus, Ustilago nuda. This amount of chemical is equivalent to a four ounce per 100 pound rate. An additional eight ounce per 100 pounds rate was prepared accordingly. The seed was then planted in two greenhouse flats for each treatment, each flat having eight rows. An untreated check, i.e., two flats with eight rows, were planted with infected seeds having no chemical treatment. The flats were regularly watered and observations on disease control and general appearance of the plants were made about three months later.

The results showed that the barley plants grown from seed that was treated with 2-amino-4-methyl-5-carboxanilidothiazole had produced seed heads without loose smut infaction, whereas the untreated flats had produced smutted barley seed heads. Furthermore, it was noticed that the plants grown from seeds treated with the four ounce rate were taller and more vigorous as compared with the plants grown from untreated seed. The plants treated at the eight ounce rate showed stunting. The formed seed heads were also fuller on the plants grown from seeds treated with the four ounce rate of chemical.

EXAMPLE 7

This example evaluates chemicals of the invention in a field test conducted at Bethany, Connecticut in the spring for control of barley loose smut, using seed treatments. The test procedure employed and the results obtained were as follows:

Fifty gram seed lots of barley (variety Larker), approximately 20% infected with loose smut, *Ustilago nuda*, were treated with experimental and a standard seed treatment chemical (Table I) by tumbling the seed with the prescribed amount of dry-formulated chemical.

Seeds from each chemical treatment were weighed in 10 gram lots, of approximately 300 seeds each, and planted in two replicate plots of 25 feet each. Counts of the numbers of smutted heads for each treatment were made approximately eleven weeks after planting.

Results are given in Table I, using the following formula for expressing percent disease control:

$$100 - \left(\frac{\text{No. of smutted seed heads in treatments}}{\text{No. of smutted seed heads in untreated check}}\right) \times 100 = \text{percent control}$$

TABLE VI.—BARLEY SEED TREATMENT FIELD TEST

| Chemical | Rate, oz./100 lbs. | Percent control |
|---|---|---|
| 2-amino-4-methyl-5-carboxanilidothiazole | 1 | 89.8 |
|  | 2 | 95.7 |
|  | 4 | 98.4 |
| 2,4-dimethyl-5-carboxanilidothiazole | 1 | 100.0 |
|  | 2 | 100.0 |
|  | 4 | 100.0 |
| Ethyl mercury phosphate | 1 | 7.7 |
| Check untreated |  | 0 |

The results show that the chemicals of this invention controlled the loose smut disease of barley.

EXAMPLE 8

This example evaluates the chemicals of this invention as foliage fungicides by their ability to protect plants from subsequent infection by fungus diseases.

One gram of the chemical to be tested was ground with three ml. of acetone and 50 mg. of a non-ionic surface-active agent (a condensation product of an alkyl phenol and ethylene oxide). The acetone and surface-active agent are known to be inactive in the biological tests run. The mixture was diluted with water, giving suspensions containing 500 and 2000 p.p.m. of the chemical. Three suspensions were sprayed on duplicate six inch tomato plants (variety Clark's Early Special) using a gun-type sprayer which delivered 2.5 ml. per second. The plants were then placed in the greenhouse, together with untreated check plants. Twenty-four hours later the treated and untreated check plants were inoculated with a suspension of *Alternaria solani* spores by means of a 20 second spray from an atomizer sprayer (delivery rate 1 ml. per second). The plants were then kept overnight in a control chamber at a temperature of 75° F. and a 100% relative humidity. In the morning the plants were transferred to the greenhouse. Three days later the disease was scored by comparing the number of disease lesions of the treated plants with the untreated check.

The formula to determine percent control is:

$$100 - \left(\frac{\text{Avg. no. lesions on treated plant}}{\text{Avg. no. lesions on untreated plant}}\right) \times 100 = \text{percent control}$$

The following Table VII shows the results of tests with various chemicals having the structural formula previously set forth in which the values of R' are as shown in the table, and R is hydrogen unless otherwise indicated.

TABLE VII.—TOMATO EARLY BLIGHT TEST

Carboxamidothiazoles

| R | R' | Percent disease control at at 2,000 p.p.m. |
|---|---|---|
| Hydrogen | 2,4-dimethylphenyl | 87 |
| Do | 2,4,6-trimethylphenyl | 91 |
| Do | 2-methoxyphenyl | 77 |
| Do | 4-methoxyphenyl | 69 |
| Do | 4-naphthyl | 89 |
| Methyl | Phenyl | 79 |
| Ethyl | do | 96 |
| Do | o-Tolyl | 79 |
| Hydrogen | Benzyl | 96 |

EXAMPLE 9

This example evaluates chemicals of this invention for their growth regulating properties, using soil growth media with low fertility level. The employed procedure was as follows:

Fifty grams of barley seed were treated with 0.093 gram of chemical. This treatment is equivalent to three ounces/100 pounds of seed.

The soil was prepared as follows: Greenhouse potting soil, known to be deficient in nitrogen, phosphorus and potassium, was mixed with lime (30 grams lime to 30 pounds of soil) to neutralize the pH.

Ten seeds were planted per 4″ pot in three replications. The pots were then placed in saucers for subirrigation, and the saucers then placed in the greenhouse.

Observations were made on appearance of the treated and untreated plants. Appearance observation included nutritional injury such as chlorosis and necrosis. The results were as follows:

Plants grown from seed treated with 2-amino-4-methyl-5-carboxanilidothiazole produced greener foliage growth as compared with the untreated plants, indicating a beneficial effect on increasing the tolerance to nutrient deficient soils.

EXAMPLE 10

In a second test which included several of the thiazole analogs of the series of the invention, the test procedure was the same as described in Example 9 above.

The results were recorded seven and fourteen days after planting.

TABLE VIII.—BARLEY SEED TREATMENT TEST IN LOW FERTILITY SOIL

| Chemical | Results after one week | | Results after two weeks | |
|---|---|---|---|---|
|  | Average height in cm. | Plant growth appearance | Average height in cm. | Plant growth appearance |
| 2-amino-4-methyl-5-carboxanilidothiazole | 11 | Greener than check | 15 | Greener than check. |
| 2-amino-4-methyl-5-(o-tolyl)carboxamidothiazole | 0 | No germination | | Only one plant germinated. |
| 2-amino-4-methyl-5-N-benzylcarboxamidothiazole | 5 | Reduced germination | 10 | Greener than check. |
| 2-amino-4-methyl-5-N-cyclohexyl carboxamidothiazole | 11 | Normal growth | 12 | Do. |
| Untreated check | 14 | do | 15 | Severe chlorosis. |

The results show that the compounds of this invention had a marked ability to overcome symptons of nutrient deficiency. The data also show that compounds 2-amino-4-methyl-5-(o-tolyl) carboxamidothiazole and 2-amino-4-methyl-5-N-benzylcarboxamidothiazole were highly selective in their effect on different plant species. For example, 2-amino-4-methyl-5-(o-tolyl)carboxamidothiazole did not affect the growth of the bean plants (see example in Table II) when used as a seed treatment. However, this same compound was strongly affecting monocotyledonous plants such as barley when used as a seed treatment in inhibiting its germination and growth.

Having thus described our invention, what we claim and desire to protect by Letters Patent is:

1. A method of controlling fungi comprising applying to the fungi a fungicidally effective amount of a thiazole compound of the formula:

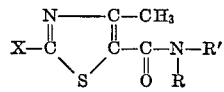

where R is selected from the group consisting of hydrogen and alkyl having from 1 to 8 carbon atoms; R' is selected from the group consisting of hydrogen, alkyl having from 1 to 8 carbon atoms, phenyl substituted lower alkyl, aryl selected from the group consisting of phenyl, phenylphenyl, naphthyl, lower alkyl substituted aryl, lower alkoxy substituted aryl, carbalkoxy phenyl, nitro aryl, halo aryl and halo alkaryl and alpha-pyridyl, or R and R' are joined together with the nitrogen atom to form a morpholido group, and X is selected from the group consisting of alkyl having from 1 to 8 carbon atoms, amino, lower alkyl substituted amino, phenyl substituted amino and lower acyl substituted amino, with the proviso that, when X is methyl, R' can only be phenyl.

2. The method of claim 1 wherein X is an amino group.

3. The method of claim 1 wherein X is methyl.

4. The method of claim 1 wherein R' is tolyl.

5. The method of claim 1 in which said thiazole compound is 2-amino-4-methyl-5-carboxanilidothiazole.

6. The method of claim 1 in which said thiazole compound is 2,4-dimethyl-5-carboxanilidothiazole.

7. The method of claim 1 in which said thiazole compound is 2-amino-4-methyl-5-(o-tolyl)carboxamidothiazole.

8. The method of claim 1 in which said thiazole compound is 2 - amino-4-methyl-5-cyclohexylcarboxamidothiazole.

9. The method of claim 1 in which said thiazole compound is 2 - methylamino-4-methyl-5-carboxanilidothiazole.

References Cited

UNITED STATES PATENTS

| | | | |
|---|---|---|---|
| 1,962,109 | 6/1934 | Alvorp | 424—270 |
| 2,900,299 | 8/1959 | Harman et al. | 424—270 |
| 3,505,055 | 4/1970 | Von Schmeling et al. | 71—290 |

OTHER REFERENCES

Boon: J. Chem. Joc (1945), pp. 601–603.

ALBERT T. MEYERS, Primary Examiner

L. SCHENKMAN, Assistant Examiner

U.S. Cl. X.R.

424—248, 263